United States Patent
VanBree

(10) Patent No.: US 7,688,381 B2
(45) Date of Patent: Mar. 30, 2010

(54) SYSTEM FOR ACCURATELY REPOSITIONING IMAGING DEVICES

(76) Inventor: Ken VanBree, 58 Starr Way, Mountain View, CA (US) 94040

(*) Notice: Subject to any disclaimer, the term of this patent is extended or adjusted under 35 U.S.C. 154(b) by 920 days.

(21) Appl. No.: 10/811,019

(22) Filed: Mar. 26, 2004

(65) Prior Publication Data

US 2004/0201756 A1 Oct. 14, 2004

Related U.S. Application Data

(60) Provisional application No. 60/461,952, filed on Apr. 8, 2003.

(51) Int. Cl.
- H04N 5/225 (2006.01)
- G06B 15/00 (2006.01)
- G06B 19/00 (2006.01)
- G06K 9/36 (2006.01)

(52) U.S. Cl. .................. 348/373; 348/207.11; 700/259; 382/287

(58) Field of Classification Search ................. 348/239, 348/207.1, 207.11, 36–39, 94, 95, 208.1–208.5, 348/373, 375, 376; 396/58, 87, 428; 382/285, 382/286, 287; 700/59, 259
See application file for complete search history.

(56) References Cited

U.S. PATENT DOCUMENTS

| 4,753,569 A | * | 6/1988 | Pryor | 700/250 |
| 4,769,700 A | * | 9/1988 | Pryor | 348/120 |
| 4,802,757 A | | 2/1989 | Plietner et al. | |
| 5,083,073 A | * | 1/1992 | Kato | 318/577 |
| 5,521,843 A | * | 5/1996 | Hashima et al. | 700/253 |
| 5,699,444 A | * | 12/1997 | Palm | 382/106 |
| 5,805,289 A | | 9/1998 | Nelson et al. | |
| 5,864,984 A | | 2/1999 | McNertney et al. | |
| 6,044,183 A | * | 3/2000 | Pryor | 382/287 |
| 6,173,087 B1 | | 1/2001 | Kumar et al. | |
| 6,359,617 B1 | | 3/2002 | Xiong | |
| 6,396,961 B1 | * | 5/2002 | Wixson et al. | 382/294 |
| 6,816,755 B2 | * | 11/2004 | Habibi et al. | 700/259 |
| 7,038,709 B1 | * | 5/2006 | Verghese | 348/169 |
| 7,277,599 B2 | * | 10/2007 | Eian et al. | 382/285 |
| 2004/0215689 A1 | * | 10/2004 | Dooley et al. | 709/200 |

* cited by examiner

Primary Examiner—Sinh Tran
Assistant Examiner—Albert H Cutler

(57) ABSTRACT

The invention provides a system and a method for accurately repositioning an imaging device in order to acquire or project a new image of a scene of interest. Accurate repositioning of an imaging device is necessary for generating or displaying high quality time-lapse image sequences for a variety of applications.

8 Claims, 5 Drawing Sheets

SYSTEM FOR ACCURATELY REPOSITIONING IMAGING DEVICES

RELATED APPLICATIONS

Priority is claimed from Provisional application 60/461,952 filed Apr. 8, 2003.

BACKGROUND

Time-lapse images are used in a variety of applications including determining seed-lot growth rates, analyzing mechanical wear or corrosion, generating calibration signatures for oil exploration, and generating special effects for the advertising and motion picture industries.

High-quality time-lapse image sequences generation requires accurate repositioning of an imaging device relative to the subject of interest. Current techniques for repositioning imaging devices require complex and expensive hardware.

Mathematical formulae for extracting the pose (camera center and orientation relative to the scene of interest) of an imaging device are known. *Multiple View Geometry In Computer Vision* by Richard Hartley and Andrew Zisserman, Cambridge University Press 2000 presents a full treatment of the required math. Similar mathematical techniques are used for blending images into panoramas or steadying an image subject to camera jitter.

Current approaches for time lapse imagery, however, require highly accurate coordinate measurement devices to determine camera location relative to target. Photogrammetry techniques have been used to account for changes in position as between two images, machine vision has been used to periodically locate an image capture device but requires dedicated hardware not easily adapted to other applications (U.S. Pat. No. 5,863,984). Real time image warping has been used to correct for camera inaccuracies in camera position, yet this solution is not useful for images taken at different times (U.S. Pat. No. 6,396,961). Image alignment techniques do not address acquisition or alignment of future images (U.S. Pat. No. 6,173,087).

What is needed is a low cost, easy to use system for generating and displaying high quality time-lapse sequences. Also needed is a time-lapse image generation system that is adaptable to various imaging applications.

SUMMARY OF THE INVENTION

The invention provides a simple method for accurately repositioning an imaging device using feedback to the imaging device operator coupled with an apparatus for automatically adjusting the position of the imaging device. The present invention provides a method and system, including a unique apparatus, that enables an imaging device to be precisely repositioned relative to a subject of interest. The invention provides a method and system for easily and accurately reposition an imaging device and to generate high-quality time-lapse image sequences, eliminating the need for expensive positioning hardware or dedicated imaging.

The invention provides a system of hardware and software to acquire and compare a new image with a reference image of the scene of interest. Photogrammetric techniques are used to determine the position of the imaging device relative to the position of the device used to capture the reference image. The difference in camera centers between the reference image and the newly acquired image is calculated and used to reposition the imaging device (the term camera center is a mathematical concept used in photogrammetry, camera centers can be calculated for any type of imaging device.). This process is repeated until the error between the reference image and the new image is below an acceptable threshold.

The imaging system to reposition an image capture device in a position relative to a subject of interest as that of a reference image of the subject of interest, includes an image capture device; a position apparatus on which the image capture device is mounted and which precisely orients the image capture device relative to a subject of interest; a reference image of the subject of interest; a computational device coupled to the position apparatus, such computational device capable of receiving images from the image capture device and of receiving the reference image, performing a comparison, and communicating position adjustments to reposition the image capture device.

DETAILED DESCRIPTION

The invention provides a system, method and apparatus for accurately repositioning imaging devices such as film-based cameras, digital cameras, video cameras, film-based projectors or video projectors. The inventive method and system employs hardware and software components that allow a user to accurately reposition an imaging device over a long-term period of minutes, hours, weeks, months or years. Accurate positioning of an imaging device is necessary for generating high quality time-lapse image sequences for a variety of applications.

Figure 1:
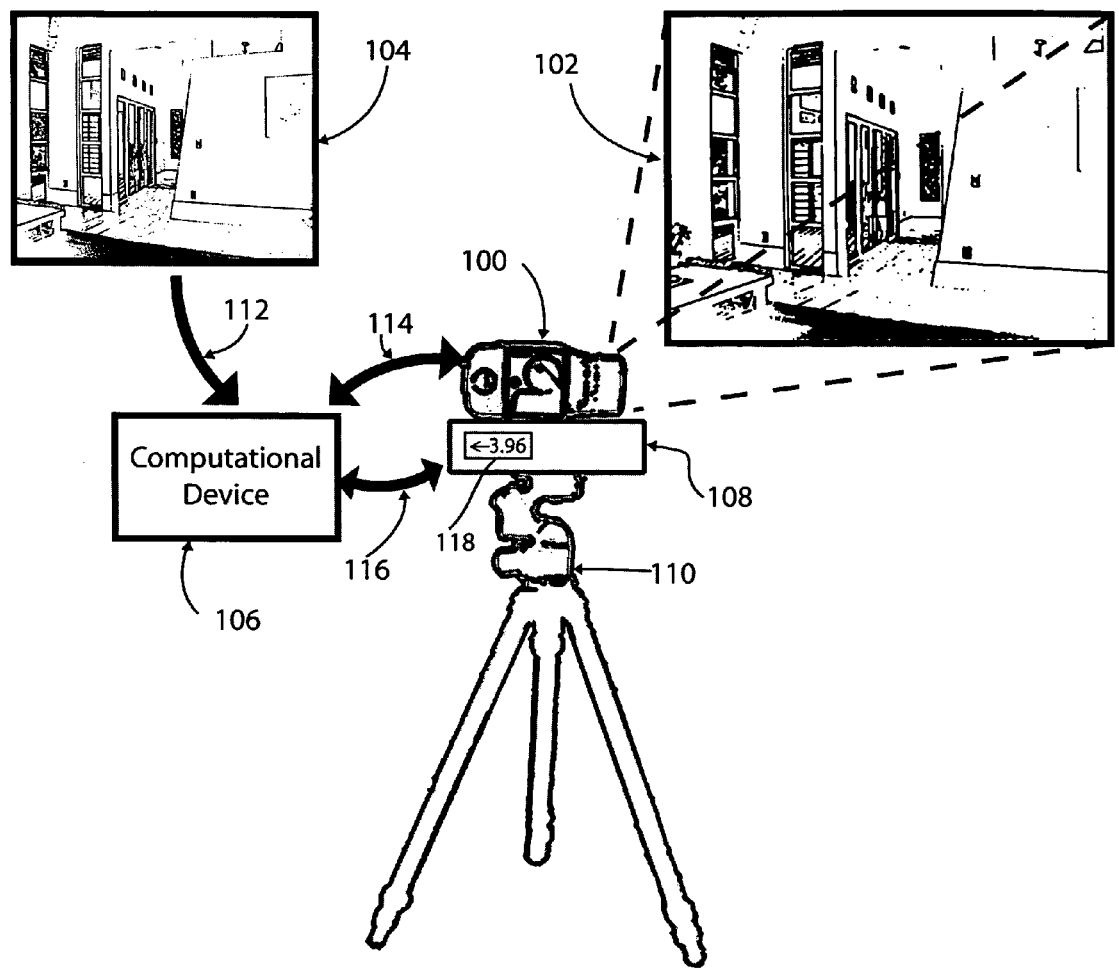
FIG. 1 depicts the components of a system for accurately repositioning an imaging device according to an embodiment of the present invention.

FIG. 1 depicts the inventive system for accurately repositioning imaging devices. The imaging device 100 is mounted on a positioning apparatus 108, which is controllable and the control of which may be automated, (said apparatus 108 is also referred to herein as the automatic repositioning apparatus) which in turn is mounted on a stable platform 110. While the automatic repositioning device 108 may be incorporated into the image capture device, or be coupled to the imaging device in alternate configurations, including remote or robotic control, the system discussed here contemplates a distinct apparatus. The imaging device 100 captures a new image of the scene of interest 102, which is input to the computational device 106 through the bi-directional path 114. The reference image 104 is also input to the computational device 106 through path 112. The computational device 106 determines the difference in camera pose, and transmits this information to the automatic repositioning apparatus 108 through the bi-directional path 116. A user interface 118 indicates the amount and direction of movement required to accurately reposition the imaging device relative to the scene of interest 102. The automatic repositioning apparatus 108 accurately repositions the imaging device 100 if the required displacement is within the range of motion of the apparatus 108. If the required displacement is outside the range of motion of the automatic repositioning apparatus 108, then the user interface 118 instructs the operator to move the stable platform 110 the required distance in the required directions.

Figure 2:
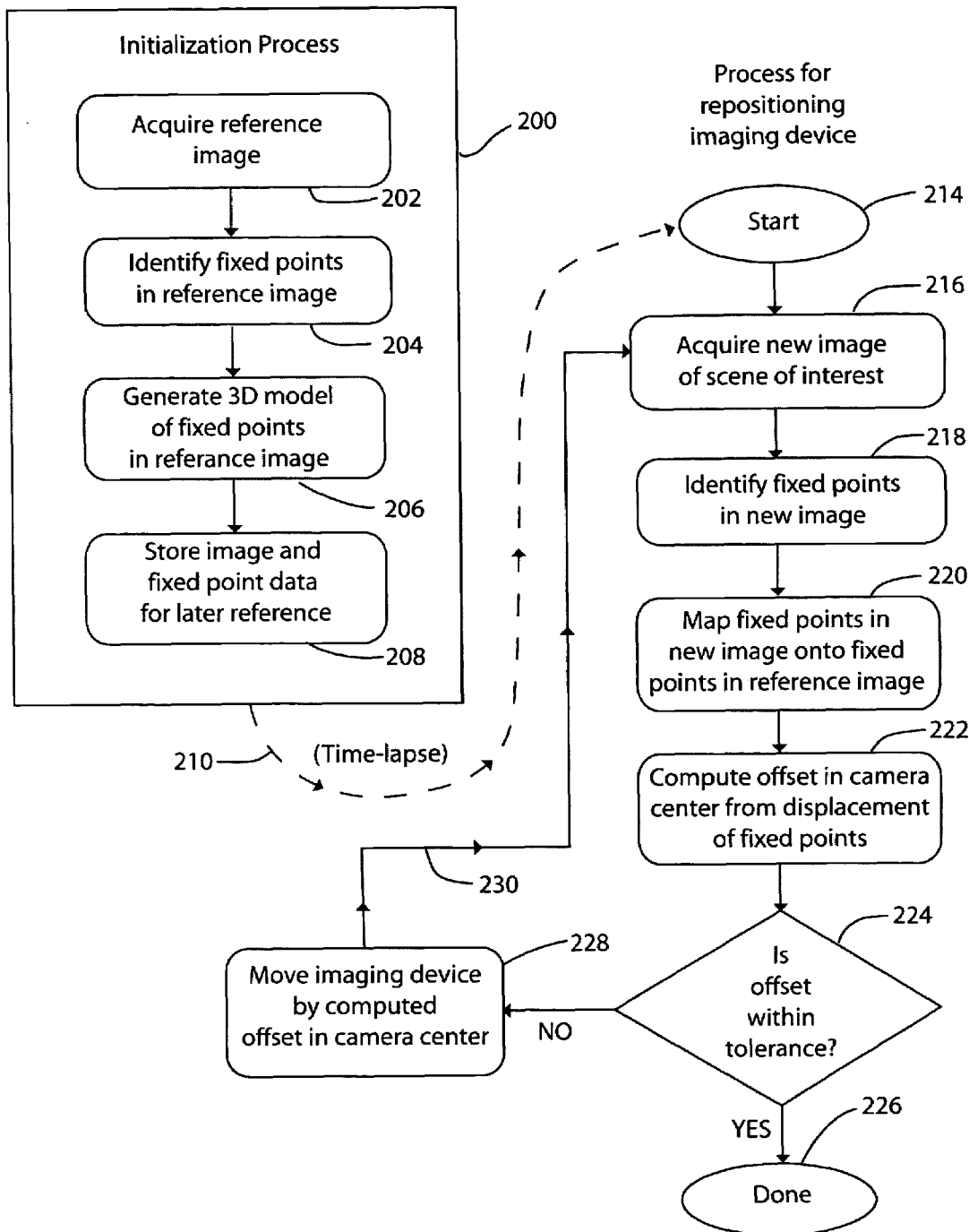
FIG. 2 is a generalized flowchart of the various function modules of the system for accurately repositioning an imaging device according to an embodiment of the present invention.

FIG. 2 is a generalized flowchart for the various function modules comprising one embodiment of the present invention. The initialization process 200 is used to prepare an image of the scene of interest for use as a reference image in the repositioning process. The initialization process includes steps 202, 204, 206, and 208. The first step of the initialization process is 202; acquire a reference image of the scene of interest. This image can be an historic photograph, or an image captured by a film-based or digital camera. The preferred embodiment uses a digital image from the same imaging device that will be repositioned in later steps of the process. Step 204 is the identification of points in the reference image that are likely to remain stable over the timeframe of interest. Various algorithms exist to automatically extract features such as contours, edges and corners from an image. The preferred embodiment uses a combination of automatic feature extraction and guidance from the user to identify a number of fixed points in the reference image. In step 206, a three dimensional model of the object represented by the fixed points is generated. This three dimensional (3D) model can be generated directly by measurement of points in the scene of interest, or it can be extracted from multiple views of the scene of interest taken from known camera centers. In step 208, the reference image, the location of the fixed points and the 3D model of the fixed points are stored for use later in the repositioning process.

The dashed line 210 in FIG. 2 indicates that there is a time-lapse of undetermined length between the execution of the initialization process 200 and the repositioning process that begins with step 214. Step 216 is to acquire a new image of the scene of interest. In the preferred embodiment, the same imaging device used to generate the reference image generates the new image. In step 218 fixed points are identified in the reference image using techniques similar to those described for step 204. In steps 220 and 222, the fixed points identified in step 218 are mapped onto the fixed points identified in step 204 and the offset in camera center between the new image and the reference image is computed. Algorithms for computing the offset in camera center between two images and a full treatment of the mathematics required are in *Multiple View Geometry In Computer Vision* by Richard Hartley and Andrew Zisserman, Cambridge University Press 2000. The inventive method employs well-known mathematical formulae for extracting the pose (camera center and orientation relative to the scene of interest) of an imaging device.

In step 224, the computed offset in camera center between the new image and the reference image is analyzed. If the offset is small enough that further repositioning of the imaging device will not improve the quality of the time-lapse sequence, then the process exits through step 226. If the offset is large enough to decrease the quality of the time-lapse sequence, then the imaging device is moved by the computed offset (step 228) and the repositioning process in repeated through feedback path 230.

Figure 3:
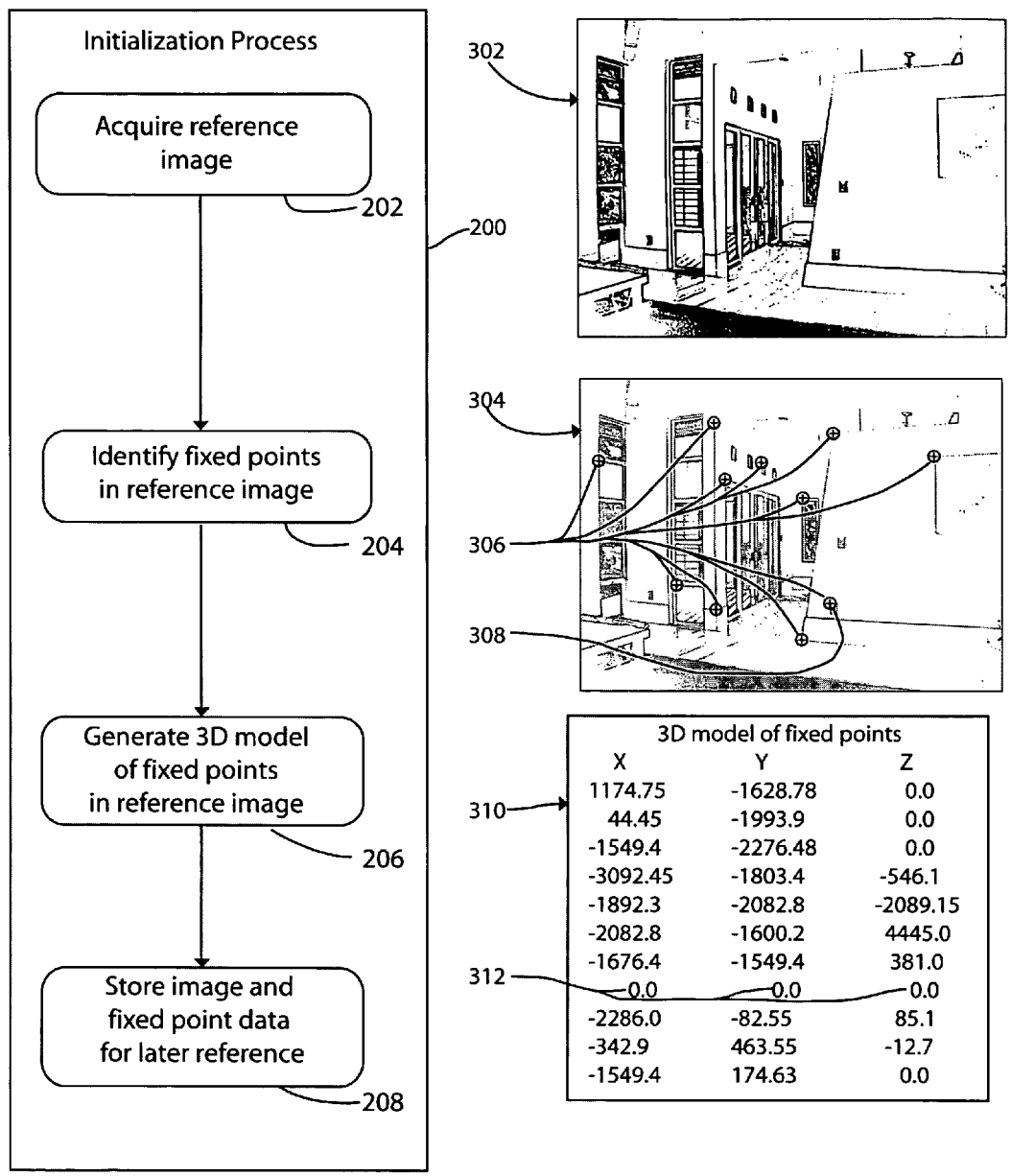
FIG. 3 depicts further details of the initialization process, including an example reference image. The reference image is analyzed in order to extract data that will be used later to reposition the imaging device.

FIG. 3 is a generalized flowchart of the method of operation of one embodiment of the initialization process 200 of the present invention. 302 is a conceptual illustration of a reference image acquired in step 202. The results of the process for identifying fixed points in the reference image (step 204 from FIG. 2) are shown conceptually in image 304. The circumscribed crosses collectively identified as 306 indicate the locations of the fixed points in the reference image. An arbitrary fixed point, 308, was chosen as the origin of the real-world coordinate system for the 3D model of the fixed points. The 3D model of the fixed points consisting of X, Y, and Z coordinates is shown in tabular form in 310. The coordinates of the arbitrary origin (the point identified as 308) are shown collectively as 312.

Figure 4:
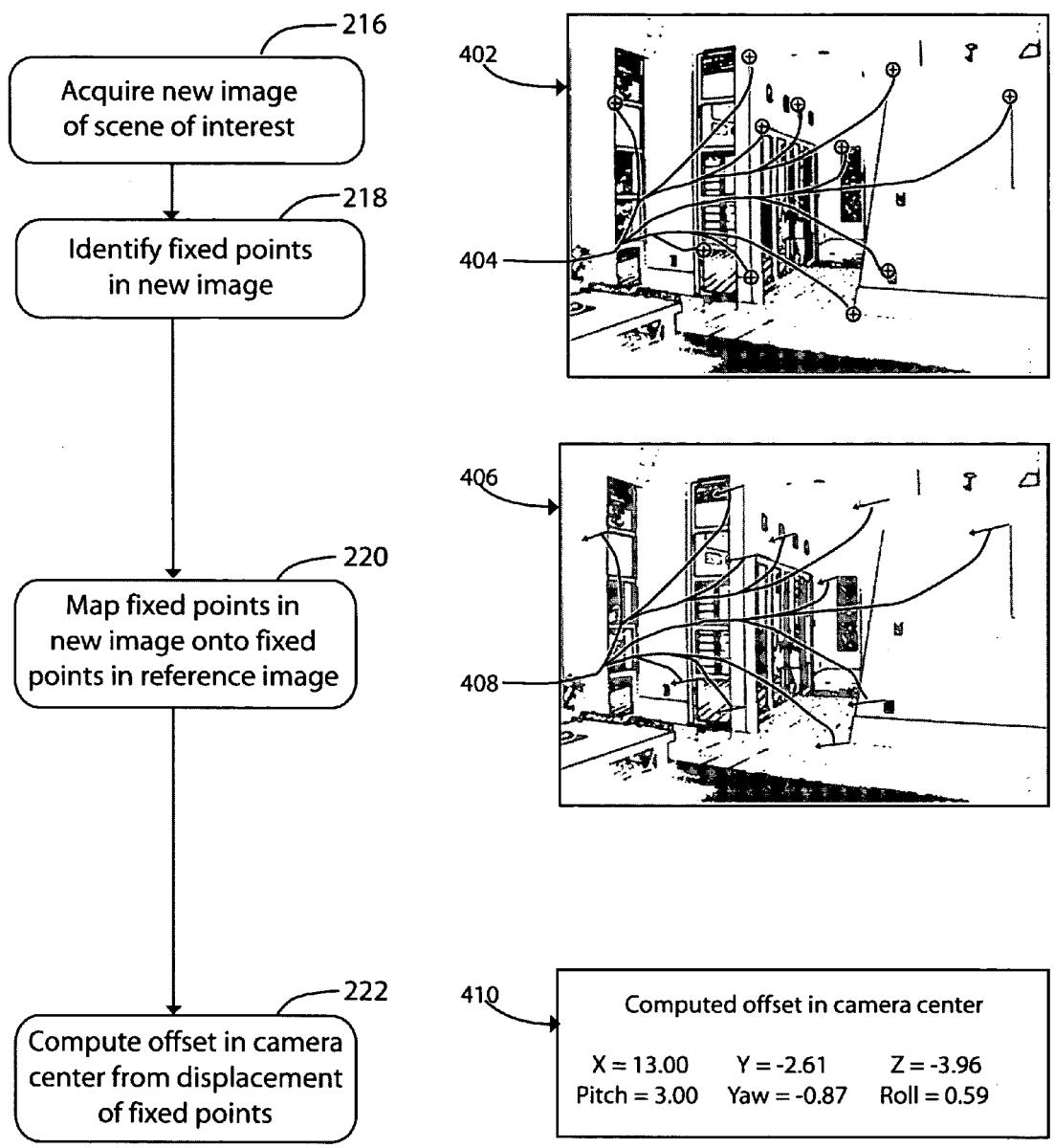
FIG. 4 depicts further details on the repositioning process, including an example of a new image and the computation of the offset in camera centers.

FIG. 4 is a generalized flowchart of a portion of the process for repositioning an imaging device in one embodiment of the present invention. 402 is a conceptual illustration of a new image of the scene of interest with fixed points identified. The circumscribed crosses collectively identified as 404 indicate the locations of the fixed points in the new image. The arrows collectively identified as 408 in conceptual illustration 406 indicate the mapping of the fixed points in the new image into the fixed points in the reference image. A table of the computed offset in camera center between the new image and the reference image are shown in 401. These offsets can be easily computed using algorithms explained in Multiple View Geometry by Hartley and Zisserman.

Figure 5:
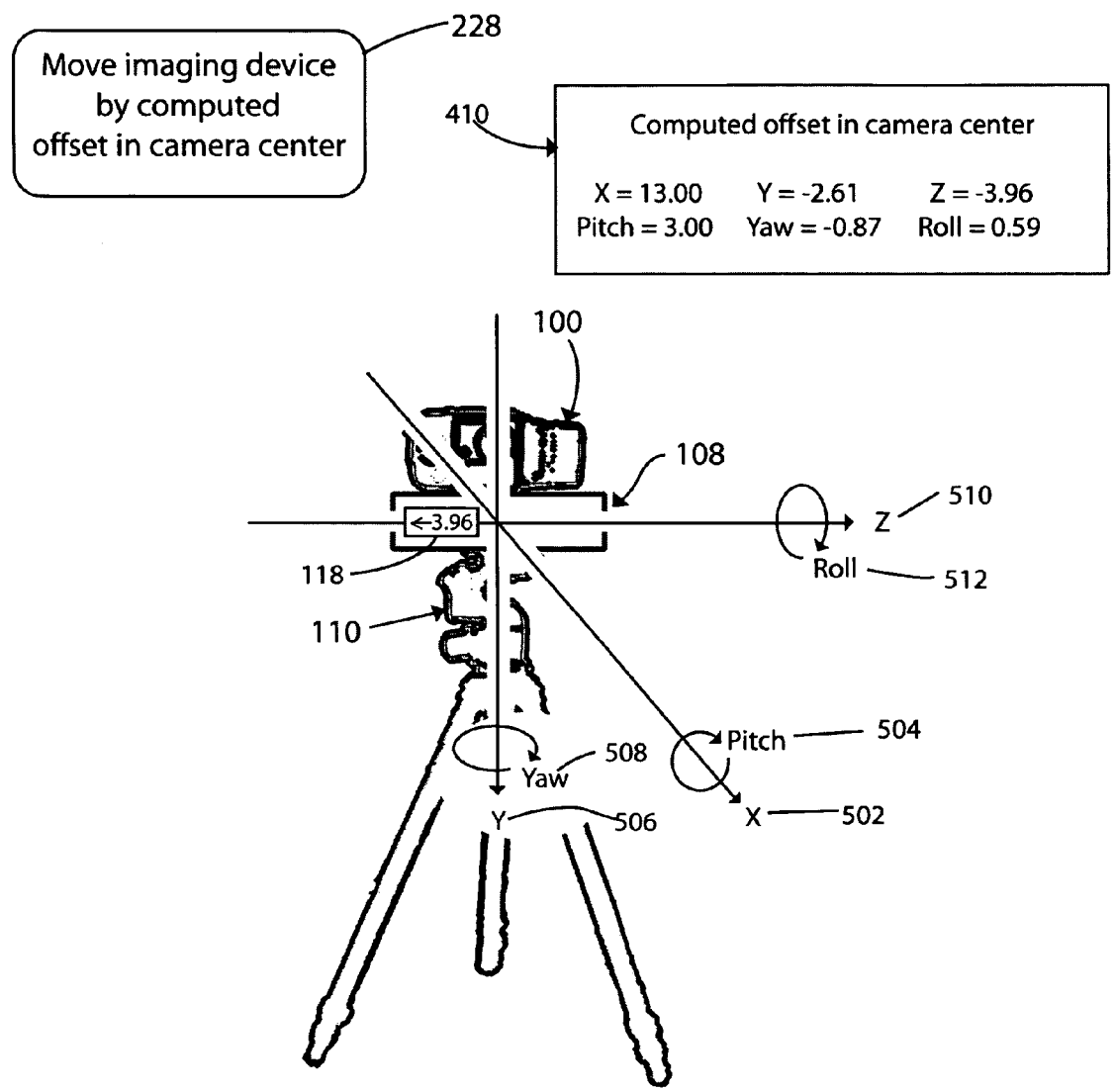
FIG. 5 illustrates the use of the repositioning apparatus to move the imaging device to the new position computed in the process illustrated in FIG. 4.

FIG. 5 is a conceptual illustration of the movement of the imaging device by the computed offset in camera centers. The movement of the imaging device has six degrees of freedom, consisting of translation along three orthogonal axes and rotation around those same orthogonal axes. These translations are shown conceptually in FIG. 5 as translation along the X, Y, and Z axis, identified as 502, 506 and 510 respectively. The rotations are shown conceptually in FIG. 5 as Pitch, Yaw, and Roll, identified as 504, 508, and 512 respectively. The coordinate directions are chosen to be consistent with common practice in imaging applications. The user interface 118 in FIG. 5 indicates that the imaging device 100 should be moved 3.96 units in the negative Z direction. This is consistent with the offset in camera center computed in step 222 and shown in table 410 of FIG. 4. If the movement required in 228 is too large to be done automatically by apparatus 108, then the user interface 118 will indicate that the operator needs to move the stable platform 110 by a specified amount in the X, Y, and Z directions and begin the repositioning process again with step 216. If the computed offset in camera center is within the range of the automatic repositioning apparatus 108, then the imaging device 100 will be repositioned automatically and a new image will be acquired. The repositioning process stops when the displacements between the fixed points in the new image and the reference image are within the tolerance required for the time-lapse sequence being generated.

The inventive method and system and the apparatus used therein can be applied to, but is not limited to, applications such as: revealing hidden detail in commercial and residential construction; documenting changes that occur during timeframes of arbitrary length; revealing sun/shade patterns over the course of a day or a year; producing special effects for the movie and advertising industry; documenting cityscapes as they change over time; analyzing plant growth over days and years; inferring weather related effects from leaf growth comparisons over multiple years; recording natural erosion or wear patterns; creating new art-forms with time as an element; displaying proposed changes in the design of interior spaces.

I claim:

1. An imaging system to reposition an image capture device in a position relative to a subject of interest according to six degrees of freedom as preserved in association with a reference image of the subject of interest, comprising:

an image capture device;

an automatic repositioning apparatus on which the image capture device is mounted, which, in turn, is mounted on a stable platform, said automatic repositioning apparatus operable to orient the image capture device relative to a subject of interest according to six degrees of freedom;

an acquired reference image of the subject of interest, wherein said acquired reference image is acquired of a random or arbitrary scene of interest, identifying fixed points in said reference image, and wherein said reference image comprises a computational model generated from an initial image of said subject of interest;

a computational device coupled to the automatic repositioning apparatus, including a user interface, such computational device capable of receiving images from the image capture device and receiving the reference image, performing a comparison, and communicating adjustments to reposition the image capture device along any of six degrees of freedom, wherein said image capture device captures a new image of the scene of interest, which new image is input to the computational device through a bi-directional path, and said reference image is input to the computational device through said path, whereupon said computational device determines the difference in position of the imaging device, and transmits this information to said automatic repositioning apparatus through said bi-directional path and said user interface indicates the amount and direction of movement required to accurately reposition the imaging device relative to the scene of interest and where the automatic repositioning apparatus accurately repositions the imaging device if the required displacement is within the range of motion of the apparatus, and if the required displacement is outside the range of motion of the automatic repositioning apparatus, then the user interface instructs the operator to move the stable platform the required distance in the required directions.

2. An imaging system as in claim 1 wherein the communication of position adjustments is via signals to the automatic repositioning apparatus from the computational device.

3. A method for repositioning an image capture device relative to a subject of interest according to six degrees of freedom comprising the steps of:
   a) initializing an imaging system, where said imaging system includes an image capture device, an automatic repositioning apparatus which also serves to provide a mount for said image capture device, and which, in turn, is mounted on a stable platform, and said automatic repositioning apparatus is connected to a computational device which includes a user interface, wherein initializing includes the steps of:
      a.1) obtaining a reference image of the subject of interest, wherein said reference image is acquired of a random or arbitrary scene of interest, identifying fixed points in said reference image, and wherein said reference image comprises a computational model generated from an initial image of said scene of interest, wherein said reference image includes multiple reference points in 3-dimensional space;
      a.2) repositioning the image capture device relative to the subject of interest, where such repositioning uses six degrees of freedom;
   b) imaging the subject of interest;
   c) computing the difference between the reference image of the subject of interest and the image capture device image, said computational device capable of receiving the reference image image capture such that when said imaging device captures a new image of the scene of interest, which image is input to the computational device, as is the reference image of scene of interest, such that said computational device determines the difference in position of the image capture device, transmits position difference information to the automatic repositioning apparatus and indicates via the user interface amount and direction of movement to accurately reposition the image capture device relative to scene of interest;
   d) refining the position of the image capture device by the automatic repositioning apparatus and where the required displacement is outside the range of motion of the automatic repositioning apparatus, then the user interface instructs the operator to move the stable platform the required distance in the required directions, so that the image capture device is in the same position relative to the subject of interest as that position from which the reference image was obtained, where such refining the position of the image capture device occurs along six degrees of freedom.

4. A method as in claim 3 wherein said computational model is a three dimensional model.

5. A method as in claim 3 where the reference image is obtained after fixed reference points have been selected in the subject of interest.

6. A method as in claim 3 where the step of initializing includes extracting reference points from more than one image of the subject of interest representing more than one camera center.

7. A method as in claim 3 where time has elapsed between the initialization process and the repositioning of the image capture device.

8. An apparatus for positioning an imaging device and coupling to an image capture device and where such automatic repositioning apparatus positions said image capture device along six degrees of freedom, such that the positioning of the image capture device is controllable and said apparatus orients the image capture device relative to a subject of interest using six degrees of freedom to orient the image capture device, and wherein said positioning of said image capture device relies on a reference image of the subject of interest, wherein said reference image is based on an initial acquired image of a random or arbitrary scene of interest, where said initial acquired image enables the identification of fixed points in said reference image, and wherein said reference image comprises a computational model generated from said initial acquired image of said subject of interest; and
   where said automatic repositioning apparatus, coupled to said image capture device, is mounted on a stable platform, and said automatic repositioning apparatus is connected to a computational device, said computational device capable of receiving the reference image, such that when said image capture device captures a new image of the scene of interest, which image is input to the computational device, as is the reference image of scene of interest, whereupon said computational device determines the difference in position of the image capture device, and transmits position difference information to the automatic repositioning apparatus, and, the user interface indicates amount and direction of movement to accurately reposition the image capture device relative to the scene of interest, and the user interface instructs the operator to move the stable platform the required distance in the required directions where the required displacement is outside the range of motion of the automatic repositioning apparatus.

* * * * *